United States Patent
Malhotra et al.

(10) Patent No.: US 8,209,406 B2
(45) Date of Patent: Jun. 26, 2012

(54) ASSESSMENT OF CLICK OR TRAFFIC QUALITY

(75) Inventors: Dipendra Malhotra, Princeton, NJ (US); Brett Michael Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 446 days.

(21) Appl. No.: 11/458,313

(22) Filed: Jul. 18, 2006

(65) Prior Publication Data

US 2007/0100993 A1    May 3, 2007

Related U.S. Application Data

(60) Provisional application No. 60/731,386, filed on Oct. 28, 2005.

(51) Int. Cl.
*G06F 15/173* (2006.01)
*G06F 15/16* (2006.01)
*G06F 17/18* (2006.01)
*G06F 19/00* (2011.01)
*G07G 1/10* (2006.01)
*G07G 1/12* (2006.01)
*G06Q 30/00* (2012.01)
*G06Q 40/00* (2012.01)

(52) U.S. Cl. ......... 709/223; 709/219; 709/224; 705/25; 705/26.64; 705/37; 702/179; 370/229

(58) Field of Classification Search ........... 705/37, 705/25, 26.6, 374; 709/224, 223, 219; 702/179; 370/229

See application file for complete search history.

(56) References Cited

U.S. PATENT DOCUMENTS

| | | | |
|---|---|---|---|
| 6,018,619 A * | 1/2000 | Allard et al. | 709/224 |
| 6,584,504 B1 * | 6/2003 | Choe | 709/224 |
| 6,766,370 B2 * | 7/2004 | Glommen et al. | 709/224 |
| 6,904,461 B1 * | 6/2005 | Randhava et al. | 709/224 |
| 7,003,565 B2 * | 2/2006 | Hind et al. | 709/224 |
| 7,020,622 B1 | 3/2006 | Messer | |
| 7,065,534 B2 | 6/2006 | Folting et al. | |
| 7,185,085 B2 * | 2/2007 | Bean | 709/224 |
| 7,610,276 B2 | 10/2009 | Yomtobian | |
| 2002/0029290 A1 * | 3/2002 | Burema et al. | 709/238 |
| 2002/0049687 A1 * | 4/2002 | Helsper et al. | 706/45 |
| 2002/0099649 A1 | 7/2002 | Lee et al. | |
| 2003/0028529 A1 * | 2/2003 | Cheung et al. | 707/3 |
| 2003/0128233 A1 * | 7/2003 | Kasriel | 345/738 |
| 2003/0229692 A1 * | 12/2003 | Vo | 709/224 |

(Continued)

OTHER PUBLICATIONS

Click Fraud: Web Analytics Firm on the Hunt for Internet Search Marketing Ghost; Sep. 27, 2004; Business Wire; 2-pages.*

(Continued)

*Primary Examiner* — Gregory Johnson
(74) *Attorney, Agent, or Firm* — Robert C. Kowert; Meyertons, Hood, Kivlin, Kowert & Goetzel, P.C.

(57) ABSTRACT

Systems and methods enable displaying an indication of traffic quality. The system retrieves keyword or other traffic data for at least one keyword associated with at least one search engine. The system compares the traffic data for a first time period to the traffic data for a second time period, according to one or more date ranges and other parameters selected by a user for each time period. As a result of the comparison, an indication of the traffic quality associated with a disparity between the first time period data and the second time period data, if any, is displayed.

26 Claims, 15 Drawing Sheets

U.S. PATENT DOCUMENTS

| | | | |
|---|---|---|---|
| 2004/0103024 A1 | 5/2004 | Patel et al. | |
| 2004/0138858 A1* | 7/2004 | Carley | 702/186 |
| 2004/0153365 A1* | 8/2004 | Schneider et al. | 705/14 |
| 2004/0190448 A1* | 9/2004 | Fishteyn et al. | 370/229 |
| 2004/0230491 A1* | 11/2004 | Messer et al. | 705/26 |
| 2005/0097088 A1* | 5/2005 | Bennett et al. | 707/3 |
| 2005/0144065 A1* | 6/2005 | Calabria et al. | 705/14 |
| 2005/0144067 A1* | 6/2005 | Farahat et al. | 705/14 |
| 2005/0262240 A1* | 11/2005 | Drees et al. | 709/224 |
| 2006/0010105 A1 | 1/2006 | Sarukkai et al. | |
| 2006/0026060 A1 | 2/2006 | Collins | |
| 2006/0085408 A1 | 4/2006 | Morsa | |
| 2006/0136294 A1* | 6/2006 | Linden et al. | 705/14 |
| 2006/0200555 A1 | 9/2006 | Shannon et al. | |
| 2007/0033106 A1* | 2/2007 | Mason | 705/14 |
| 2007/0055477 A1* | 3/2007 | Chickering et al. | 702/182 |
| 2007/0061211 A1* | 3/2007 | Ramer et al. | 705/25 |
| 2007/0073579 A1* | 3/2007 | Immorlica et al. | 705/14 |
| 2007/0078958 A1* | 4/2007 | Bennett | 709/223 |
| 2007/0083519 A1* | 4/2007 | Daniels et al. | 707/10 |
| 2007/0094355 A1* | 4/2007 | Mulakala et al. | 709/219 |
| 2007/0100993 A1 | 5/2007 | Malhotra et al. | |
| 2007/0185855 A1 | 8/2007 | Shah et al. | |
| 2007/0271352 A1 | 11/2007 | Khopkar et al. | |
| 2008/0004937 A1 | 1/2008 | Chow et al. | |
| 2008/0004955 A1 | 1/2008 | Mathew et al. | |
| 2008/0052278 A1 | 2/2008 | Zlotin et al. | |
| 2008/0114624 A1 | 5/2008 | Kitts | |

OTHER PUBLICATIONS

How to Defend Your Website Against Click Fraud; Michael Bloch and Dmitri Eroshenko; Clicklab; 2004; 20-pages.*

NetApplications Adds Click Fraud Reporting to Its Popular HitsLink Web Site Statistics and Keyword Analytics Tool; Business Wire; Mar. 1, 2005; 2-pages.*

PCT International Search Report and Written Opinion, PCT/US06/42475, Mar. 26, 2008, 8 pages.

"Advertisement System, Method and Computer Program Product," IP.com, Document ID IPCOM000138557D, Jul. 24, 2006, pp. 0-38.

U.S. Appl. No. 12/044,655 filed Mar. 7, 2008, all pages.

Mark J. Nigrini, "I've Got Your Number," AICPA Journal of Accountancy, www.aicpa.org/pubs/jofa/may1999/nigrini.htm, May 1999, 7 pages.

David Berkowitz, "Demystifying Click Fraud," www.promotionworld.com/news/news/050322clickfraudexplainedppc.htm, Mar. 22, 2005, 2 pages.

Brian Grow, et al., "Click Fraud," BusinessWeek Online from www.businessweek.com, Oct. 2, 2006, 5 pages.

Click Quality Team, "How Fictitious Clicks Occur in Third-Party Click Fraud Audit Reports," Aug. 8, 2006, Google, Inc., pp. 1-17.

Michael Bloch, et al., "How to Defend Your Website Against Click Fraud," 2004, 20 pages.

S. Bartlett Boughton, "Search Engine Marketing," 2005, St. Edward's Univ., Perspectives on Business, pp. 29-33.

Net Applications, "Using Web Analytics to Identify Possible Click Fraud," 2005, pp. 1-7.

Young-Hoon Park, et al., "Modeling Browsing Behavior at Multiple Websites," 2004, Marketing Science, vol. 23, No. 3, pp. 280-303.

* cited by examiner

FIGURE 4B

ASSESSMENT OF CLICK OR TRAFFIC QUALITY

RELATED APPLICATIONS

This application claims the benefit of Provisional Patent Application Ser. No. 60/731,386, entitled "Assessment of Click or Traffic Quality," filed Oct. 28, 2005, which is hereby incorporated by reference.

BACKGROUND

The present invention relates to detection of fraudulent clicks in an online pay-per-click environment. Pay-per-click advertising programs offer online advertisers an immediate way to generate qualified website traffic by buying sponsored links on the search result pages of various search engines. However, this method of advertising also is vulnerable to clicks that are not relevant, i.e., are not from traffic genuinely interested in the keyword and/or product or service associated with the keyword. Non-relevant traffic is usually referred to as fraudulent clicks. A common example is a machine, rather than an actual consumer, increasing the traffic for a specific keyword. Fraudulent clicks can take many forms, as discussed herein, each of which can have a significant negative economic effect on the advertiser.

Traditional fraudulent clicks detection services focus on the "pre-click" environment, or the steps that take place to bring a visitor to a site, and examine current impression and click numbers. For example, multiple clicks for a keyword coming from a single IP address or a single website over a short period of time indicates potential fraudulent clicks, as does traffic from a website that is outside of the geographical area in which the advertisement is run. However, pre-click data alone lacks post-click data, or a back-end analysis, such as effect on ROAS (return on advertising spend), which would help catch fraudulent clicks left undetected by this type of pre-click analysis.

SUMMARY

The present invention enables monitoring of the quality of web traffic. In various embodiments, the present invention provides methods and systems for displaying an indication of traffic quality. The traffic quality discussed herein is primarily keyword traffic quality, which is measured using data ("keyword traffic data") corresponding to various traffic quality metrics for traffic driven by purchased keywords, measured at two different time periods. However, the present invention equally applies to and encompasses traffic quality for traffic with other traffic driving factors, and thus the use of keyword traffic data herein does not limit the scope of the invention to keyword traffic. In one embodiment, either or both of the time periods may include more than one date range. The traffic data includes information pertaining to various traffic quality metrics, which include return on advertising spend ("ROAS"), impressions, clicks, conversions, and click comparison. Using these metrics, traffic data for a first time period, including one or more date ranges, is compared to traffic data for a second time period, including one or more date ranges. Deviations between the first and second time periods may indicate a decrease in traffic quality, e.g., caused by various forms of fraudulent clicks.

In one embodiment, keyword traffic data is retrieved for at least one keyword associated with at least one search engine. The data is retrieved from storage and is provided as part of a bid management system. The keyword traffic data for a first time period is compared to the keyword traffic data for a second time period, according to date ranges and other parameters selected by a user. In one embodiment, either or both of the time periods may include more than one date range. For example, the "first time period" may correspond to the first week of June and the last week of June. As a result of the comparison, an indication of the keyword traffic quality associated with a disparity between the first time period data and the second time period data, if any, is displayed. The disparity is monitored relative to a threshold value corresponding to each traffic quality metric.

The display includes tabular and graphical data according to one embodiment, as displayed in a user interface for interacting with the data. Parameters such as search engine, traffic quality metric, and date ranges can be edited by the user.

The description in the specification is not all inclusive and, in particular, many additional features will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4B illustrates a user interface showing a traffic quality alert threshold page according to another embodiment of the present invention.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather, these embodiments are provided so that this disclosure will be complete and will fully convey the invention to those skilled in the art.

In particular, in the following description the invention is set forth with respect to displaying keyword traffic quality. However, one skilled in the art will recognize that the techniques described herein can be employed in the context of storage of other types of information as well. Accordingly, the particular context used herein for describing the invention is intended to be illustrative only, and is not intended to limit the scope of the invention in any way.

Figure 1:
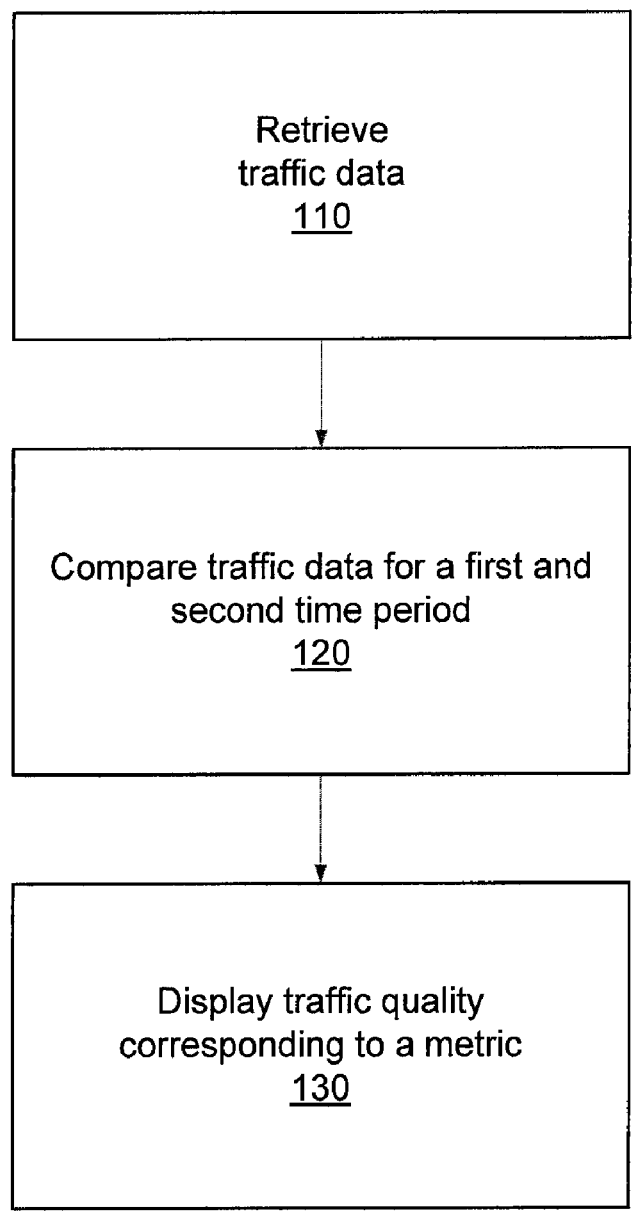
FIG. 1 is a flowchart illustrating a method of displaying traffic quality according to one embodiment of the present invention.

Referring now to FIG. 1, it is a flowchart illustrating a method of displaying traffic quality according to one embodiment of the present invention. The traffic quality discussed herein is primarily keyword traffic quality, which is measured using data ("keyword traffic data") corresponding to various traffic quality metrics for traffic driven by purchased keywords, measured at two different time periods. However, the present invention equally applies to and encompasses traffic quality for traffic with other traffic driving factors, and thus the use of keyword traffic data herein does not limit the scope of the invention to keyword traffic. Initially, keyword traffic data is retrieved 110 for a keyword associated with at least one search engine. The keyword traffic data includes information pertaining to various traffic quality metrics. Traffic quality metrics include, but are not limited to, return on advertising spend ("ROAS"), impressions, clicks, conversions, and click comparison as described herein. A significant decrease in ROAS for a time period, e.g., the current period, as compared to another time period, e.g., a previous week, month, etc., is an indicator of possible unqualified search traffic to a website. A significant increase in impressions for a time period, e.g., the current period, over another time period, e.g., a previous time period, without a corresponding increase in click throughs, indicates possible deliberate attempts to lower the relevance of the keywords. A significant increase in click throughs to a website indicates the possibility that unqualified traffic to the website is causing increased cost. A significant difference in the average ratio of conversions to clicks indicates possible fraud. Conversions include orders, sales, etc. according to one embodiment. The difference between clicks as registered by a web analytics system and clicks as measured by a search engine may indicate potential fraud. The data is retrieved from storage, e.g., from database 203 as described in conjunction with FIG. 2B, in response to a client request according to one embodiment. The request pertains to specific time periods for the data and one or more traffic quality metrics according to one embodiment, as described below in conjunction with FIGS. 5A-6C. The data is collected on a continuous basis according to one embodiment. According to one embodiment, the data is provided by a bid management system. An advantage of this aspect of the present invention is the use of both pre-click analysis of factors that drive traffic to a website, and post-click analysis of what happens at the website, or once the website is reached.

Figure 4A:
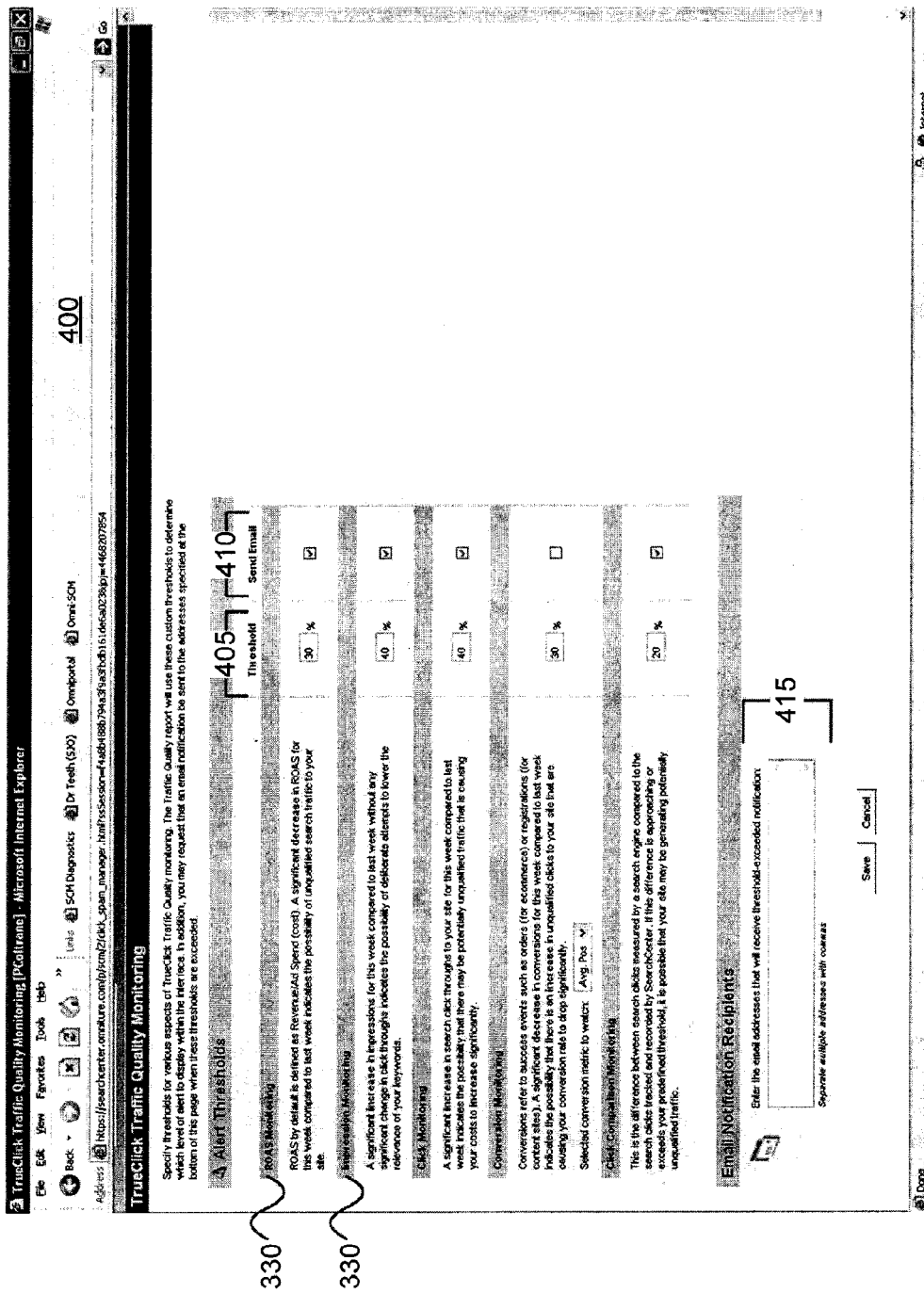
FIG. 4A illustrates a user interface showing a traffic quality alert threshold page according to one embodiment of the present invention.

After retrieving 110 the keyword traffic data, the data for a first time period is compared 120 to the keyword traffic data for a second time period. The time periods are selected by a user via a user interface, e.g., page 400 as shown in FIG. 4A, as part of a request to display traffic quality data according to one embodiment. As discussed above, in one embodiment, either or both of the time periods may include more than one date range. The requested data, and the disparity between the data sets, if any, also are prepared for display according to one embodiment.

Then, the traffic quality data is displayed 130. According to one embodiment, the data is displayed as a summary indication of keyword traffic quality. For example, indicators associated with various traffic quality metrics display the status of the metrics for the requested keywords and search engines. In one embodiment, the indicators are indicator icons 320 as described below. According to another embodiment, the traffic quality data is displayed as one or more reports. The reports correspond to all keywords for a particular search engine and traffic quality metric according to one embodiment. The reports correspond to a single keyword according to another embodiment. In one embodiment, the reports allow a side by side comparison of data corresponding to two time periods, as well as data detailing the disparity between the two periods. The reports include the ability to compare data between two or more traffic quality metrics according to one embodiment. Examples of reports are shown in FIGS. 5A-6C. In one embodiment, the user can adjust various parameters of the reports as described herein.

Figure 2A:
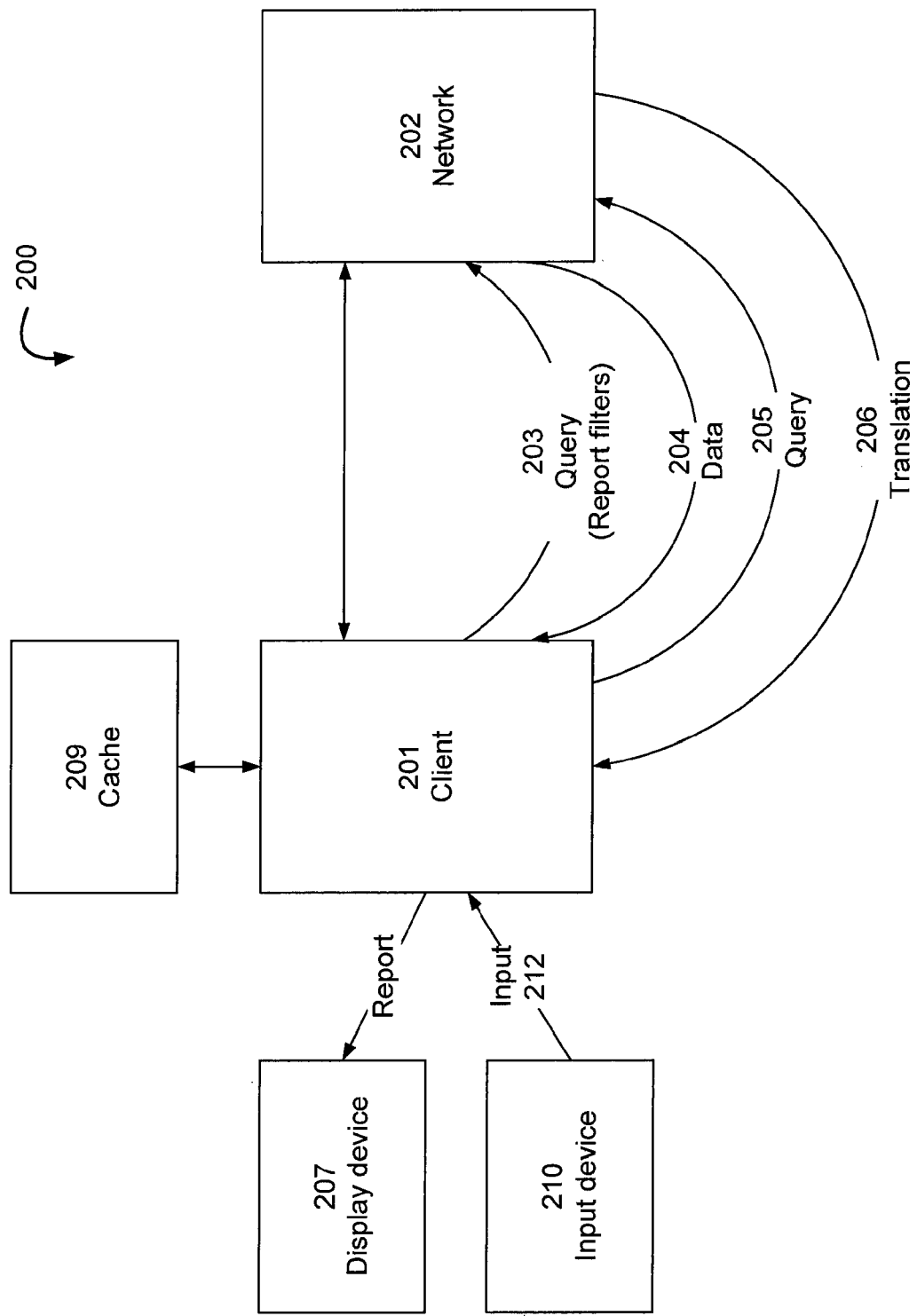
FIG. 2A illustrates a system useful for practicing the present invention according to one embodiment.

Referring now to FIG. 2A, there is shown an example of a system 200 useful for practicing the present invention according to one embodiment. One skilled in the art will recognize that the invention can be practiced using other embodiments that differ from the examples shown.

System Architecture

The system 200 includes a client 201, a network 202, and optionally a cache 209, for displaying keyword traffic quality according to one embodiment. The client 201 includes software including of a number of executable code portions and data files. These include code for viewing and interacting with website usage reports according to one embodiment of the present invention, as well as for supporting functionality of a user interface, as will be described in greater detail in conjunction with FIG. 2C.

Client 201 is responsible for orchestrating the processes performed according to the methods of the present invention. For example, client 201 receives input 212 from an input device, and sends reports to display 207 (or other output device) for output to the user. Client 201 runs on a standard personal computer.

Figure 2B:
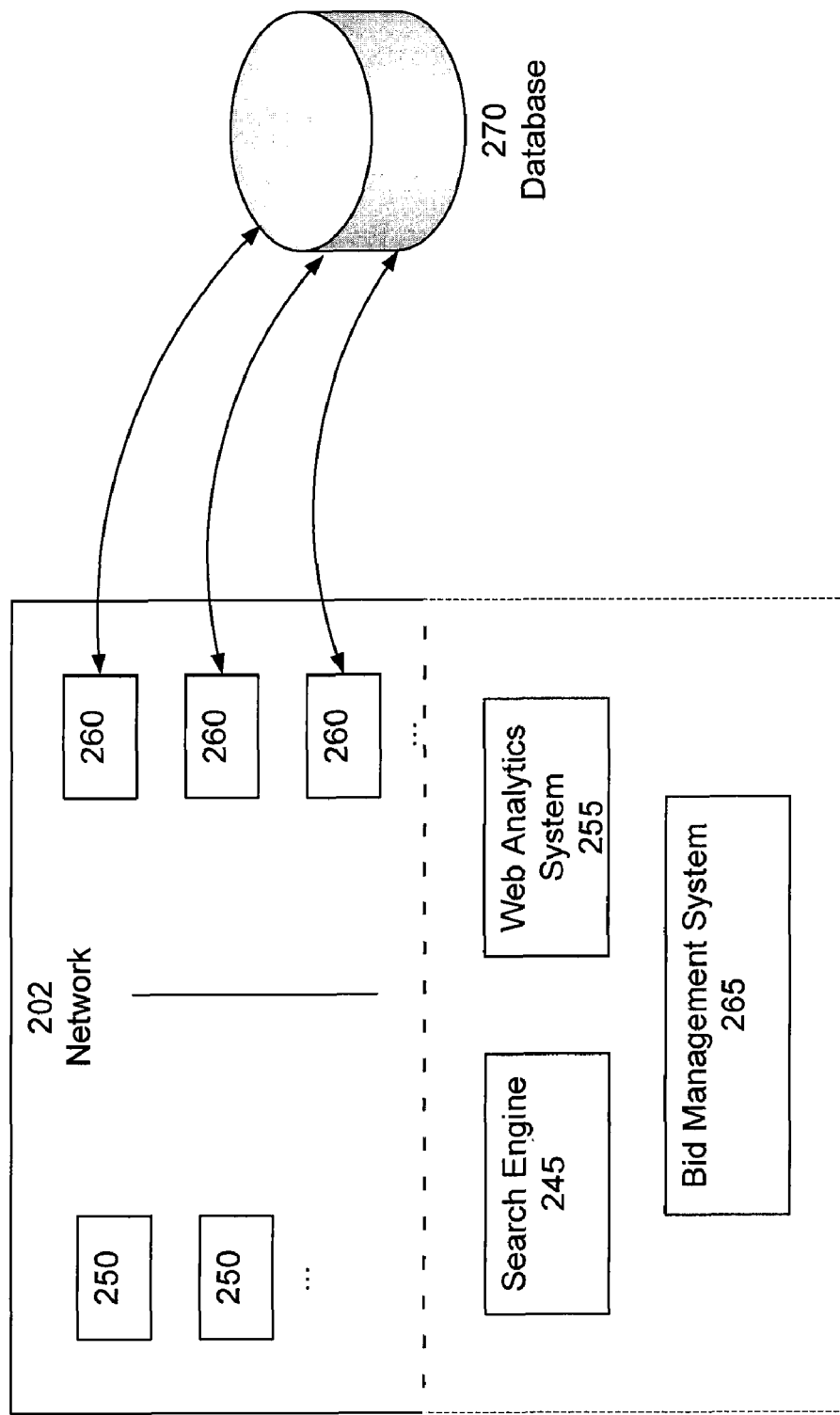
FIG. 2B illustrates an example of an architecture for a network according to one embodiment.

Network 202 is a centralized network for handling and responding to client requests for data on website usage, as described further in conjunction with FIG. 2B.

A cache 209, if present, is a standard cache of small, fast memory holding recently accessed data. The cache 209 may include, for example a list of hash codes or other look up tables for report data as described below.

In one embodiment, the components shown in FIG. 2A operate as follows. When a user requests one or more traffic quality reports via an input device 210, client 201 receives input 212 to this effect. Client 201 sends a query 203 to network 202, specifying which reports are requested, and optionally specifying one or more date ranges for the reports. In one embodiment, query 203 is in XML format.

In response to query 203, network 202 returns data 204 that contains a representation of the report data. Data 204, in various embodiments, may be coded or not, and may be hashed data or may be included in a standard look up table. For example, data 204 may specify, in hash coded terms, the text string name of an item in a report. The data 204 is received by client 201.

Client 201 stores, in local cache 209 in one embodiment, a list of previously received and decoded hash codes or look up table information, so that it can correctly interpret a hash code or table data that it has encountered previously. In one embodiment, local cache 209 is used and is cleared at the end of a session, so that only those codes previously received in the same session are stored in cache 209. In other embodiments, local cache 209 is implemented in a more persistent or less persistent fashion, depending on user needs.

Upon receiving data 204, client 201 consults cache 209 if present; if cache 209 contains the hash code(s) or meanings of data 204 (in other words, if client 201 has previously received data containing the same hash code/meaning), client 201 can interpret the meaning of the hash-coded or look-up tabled data without any further communication with network 202. If hash code(s)/meaning(s) from data 204 is/are not present, client 201 sends a query 205 to network 202; network 202 responds by sending translation 206 to client 201. Translation 206 provides client 201 with the meaning of terms. In one embodiment, client 201 stores this meaning in cache 209 for future use.

Once client 201 has received sufficient data to generate a report, it sends the traffic quality report to display 207 for output to the user. In one embodiment, if some meanings have not yet been received, client 201 still sends the report, and the report states that certain terms are unknown. In another embodiment, client 201 displays an error message and/or waits until more complete meaning data is available.

The user can interact with the displayed traffic quality report via user input device 210 such as a mouse, keyboard, or the like, and via a user interface, e.g., as described herein. The user can change the time periods for the report; in response client 201 generates and sends a new query 203 containing the new time period criteria. The above process then repeats, and an updated report is sent to display 207.

Referring now to FIG. 2B, there is shown an example of an architecture for network 202 according to one embodiment. Network 202 includes any number of front-end web servers 250 that receive queries 203, 205 from client 201, and any number of back-end servers 260 that obtain data from storage, e.g., from database 270, analyze the obtained data, and send report data back to client 201. Servers 250, 260 are computers or devices that send and receive information using well known network protocols, such as TCP/IP and HTTP, for communication across a network. Back-end servers 260 send an appropriate data set to client 201 based on the filter request. For example, if a filter request specifies that the user is only interested in visitors that used a particular web browser, back-end servers 260 remove the data that does not match the specified criterion, and only forward to client 201 the data that does match.

Network 202 also includes, or interfaces with, one or more search engines 245, a web analytics system 255, and a bid management system 265 according to one embodiment. Search engines 245 are web-based software that enables users to search the Internet using keywords. The web analytics system 255 is provides analysis of website visitation data. An example of a web analytics system is Site Catalyst manufactured by Omniture of Orem, Utah. The bid management system 265 is a system that manages sponsored links or listings, for which advertisers bid against each other for ranking on keyword phrases in the paid listings. An example of a bid management system 265 is Search Center, manufactured by Omniture of Orem, Utah.

Database 270 may be a relational database or any other type of database that stores the data used by client 201. Database 270 may be accessible by client 201 through a user interface, e.g., as described in conjunction with FIGS. 5A-6C.

Database 270 contains traffic quality data, which in one embodiment is stored in a binary format stored in some storage medium such as a hard drive. In one embodiment, the website visitation data is broken up into files, or "bricks," to facilitate extraction of portions of the data. When servers 260 extract data from database 270, they are provided with specific bricks that match the criteria.

In one embodiment, when the user requests a report showing traffic quality data for one or more specified time periods, back-end servers 260 extract data from database 270 that contains traffic logs and/or statistics. In one embodiment, servers 260 obtain data from database 270 that represents a snapshot of website visitation over a specified time period. Servers 260 then store this data in temporary local storage (such as random access memory), using for example a binary format that is encoded according to an algorithm so as to minimize bandwidth usage. In one embodiment, this binary format is identical to the format used in database 270, so that no file format translation need be performed when servers 260 extract data from database 270. Servers 260 and then apply date or other parameters as requested, and send the resulting data to client 201.

In one embodiment, whenever the user requests a broader date range for website visitation data, back-end servers 260 perform a new data extraction from database 270. However, when the user narrows the date range from a previously specified range, no new data extraction is performed; rather back-end servers 260 filter the previously extracted data according to the new filter parameters.

Figure 2C:
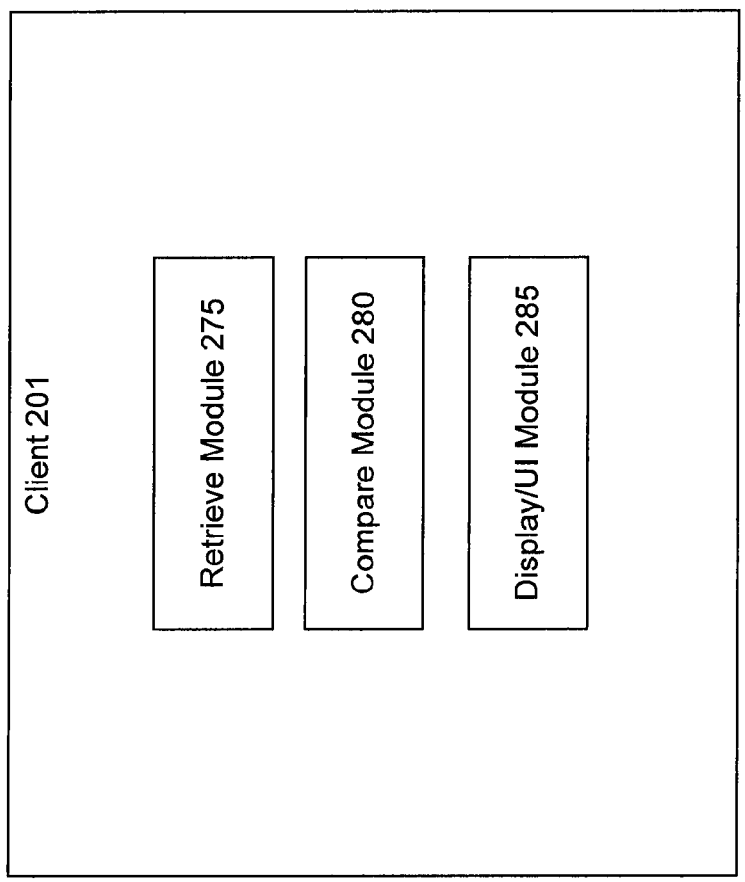
FIG. 2C is a block diagram illustrating software modules used by a client according to one embodiment of the present invention.

FIG. 2C is a block diagram illustrating software modules used by a client according to one embodiment of the present invention. The modules include of a number of executable code portions and data files. These include code for creating and supporting a user interface according to one embodiment of the present invention, as well as for supporting comparison and monitoring of traffic quality. The modules include a retrieve module 275, a compare module 280, and a display/UI module 285.

The retrieve module 275 is configured for retrieving keyword traffic data for at least one keyword associated with at least one search engine. The keyword traffic data includes information pertaining to various traffic quality metrics, including ROAS, impressions, clicks, conversions, and click comparison according to one embodiment. The data is retrieved from storage according to one embodiment, e.g., from database 203 as described in conjunction with FIG. 2B. In one embodiment, the data is provided by a bid management system. The request pertains to specific time periods for the data and one or more traffic quality metrics according to one embodiment.

The compare module 280 compares traffic quality data for a first time period to traffic quality data for a second time period according to one embodiment. The time periods are selected by a user via a user interface according to one embodiment. In one embodiment, either or both of the time periods may include more than one date range.

The display/UI module 285 prepares requested data, and the disparity between the data sets, if any, for display according to one embodiment. The traffic quality data is displayed as a summary indication of keyword traffic quality or displayed as one or more reports according to various embodiments. The reports include the ability to compare data between two or more traffic quality metrics according to one embodiment.

The above software portions 275-285 need not be discrete software modules. The software configuration shown is meant only by way of example; other configurations are contemplated by and within the scope of the present invention.

One skilled in the art will recognize that the system architecture illustrated in FIGS. 2A-C is merely exemplary, and that the invention may be practiced and implemented using many other architectures and environments.

User Interface

Figure 3A:
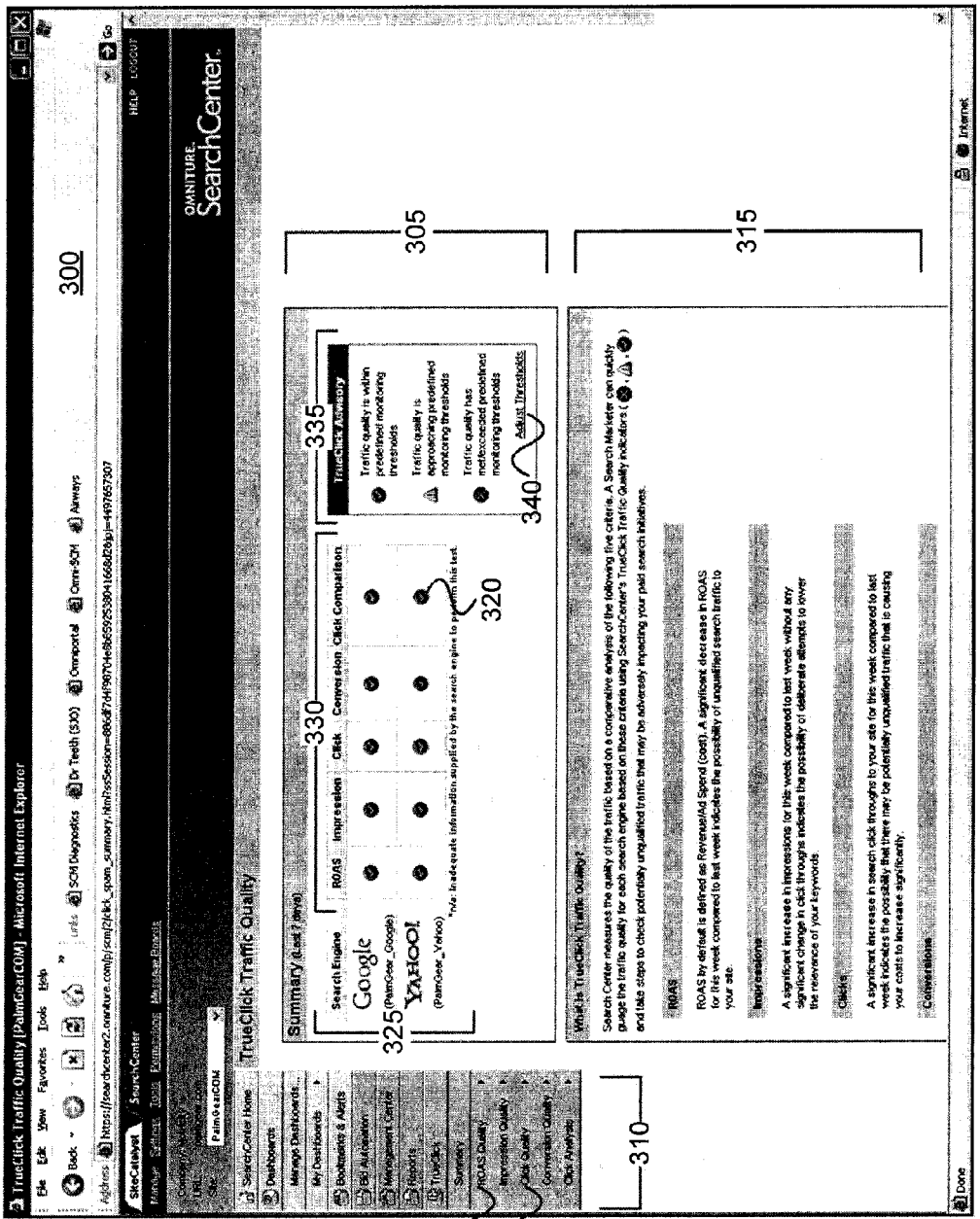
FIG. 3A illustrates a user interface showing a traffic quality summary page according to one embodiment of the present invention.

FIG. 3A illustrates a user interface showing a traffic quality summary page 300 according to one embodiment of the present invention. The traffic quality summary page 300 displays a summary of the traffic quality information that is detailed further on other user interface pages.

The traffic quality summary page 300 includes a summary indicator area 305, a controls area 310, and a definitions area 315. The summary indicator area 305 displays indicators, or indicator icons, of traffic quality 320 for one or more search engines 325 corresponding to various traffic quality metrics 330. For each metric 330 and search engine 325, an indicator of traffic quality 320 shows the current state of that metric 330, with respect to a threshold corresponding to the metric 330 according to one embodiment. In the embodiment shown, the legend 335 indicates that a circle with a check mark indicates that traffic quality for a metric 330 is within the threshold for that metric 330, a triangle with an exclamation mark indicates that the traffic quality is approaching the threshold, and an octagon with an X in the middle indicates that the threshold has been met or exceeded. Other methods of visually distinguishing the traffic quality statuses are used according to other embodiments, for example using various colors (e.g., green, yellow, red), sizes, etc. An adjust thresholds link 340 allows the user to change the thresholds according to one embodiment, as discussed below in conjunction with FIGS. 4A-4B.

The controls area 310 displays links 345 for launching more detailed reports associated with each traffic quality metric 330 according to one embodiment. Clicking on any of the links 345 launches the detailed report associated with the metric 330, as discussed in conjunction with FIGS. 5A-6B The definitions area 315 defines for the user the data that goes into each of the traffic quality metrics 330 according to one embodiment.

Figure 3B:
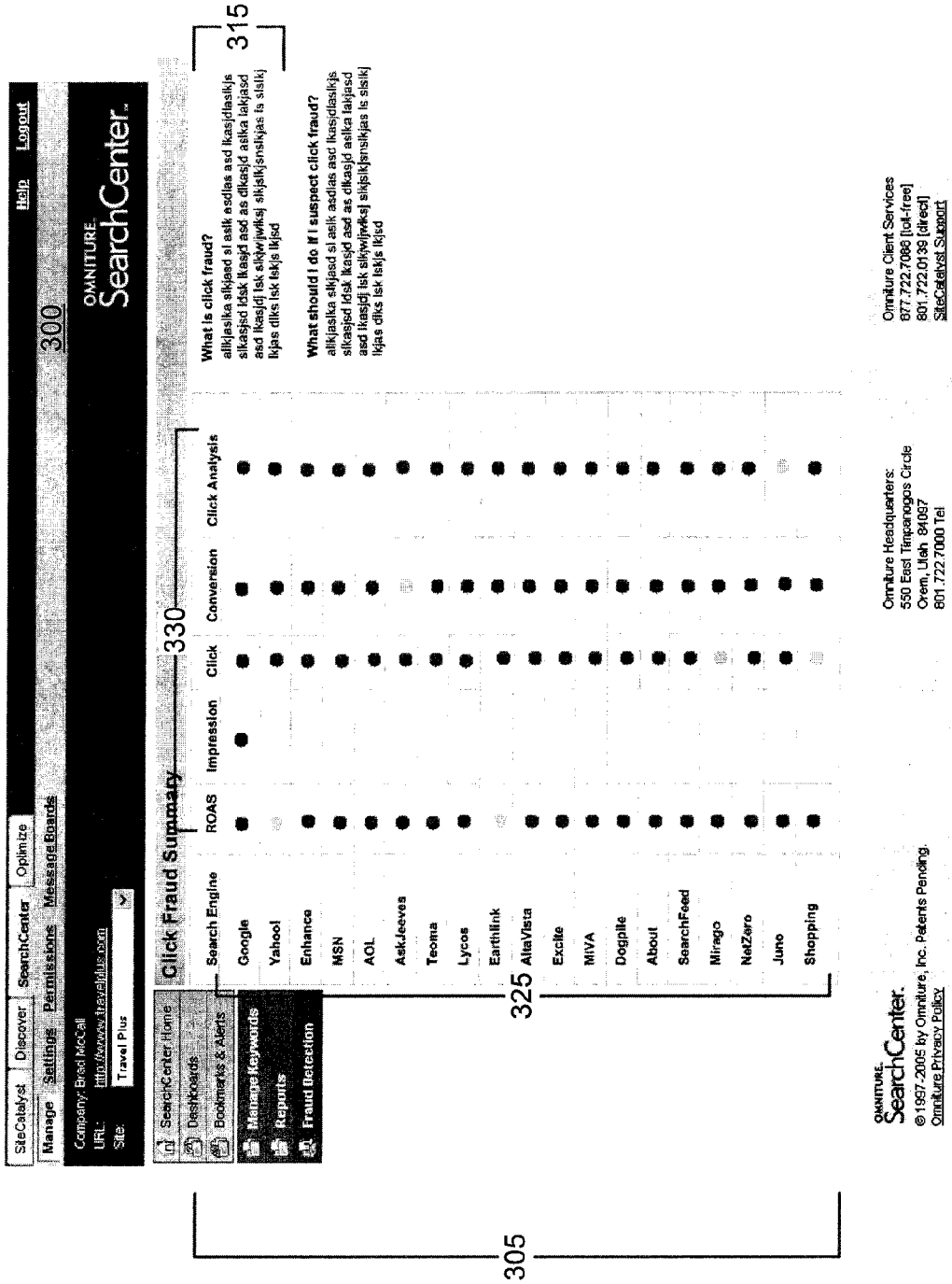
FIG. 3B illustrates a user interface showing a traffic quality summary page according to another embodiment of the present invention.

FIG. 3B illustrates a user interface showing a traffic quality summary page 300 according to another embodiment of the present invention. In this example, the focus of the page 300 is the summary indicator area 305, which displays indicator icons 320 for each search engine 325 and traffic quality metric 330 that function similar to the same user interface elements described above according to one embodiment. The summary page 300 of FIG. 3B also includes a definition area 315.

FIG. 4A illustrates a user interface showing a traffic quality alert threshold page 400 according to one embodiment of the present invention. The alert threshold page 400 includes threshold selection fields 405 that allow the user, for each traffic quality metric 330, to set an alert threshold 405 according to one embodiment. In addition, send email checkboxes 410 allow the user to select whether to send an email 410 when traffic quality data approaches, meets, or exceeds the selected threshold 405 according to one embodiment. The thresholds 405 are set at a default value, which the user can change, according to one embodiment. The alert threshold page 400 also includes an email address recipient field 415, for selecting one or more email addresses to which alerts should be sent for the send email checkboxes 410 selected, if any according to one embodiment. The threshold 405 selections made on the alert threshold page 400 provide the thresholds for the indicators of traffic quality 320 described in conjunction with FIGS. 3A-3B according to one embodiment.

Figure 4B:
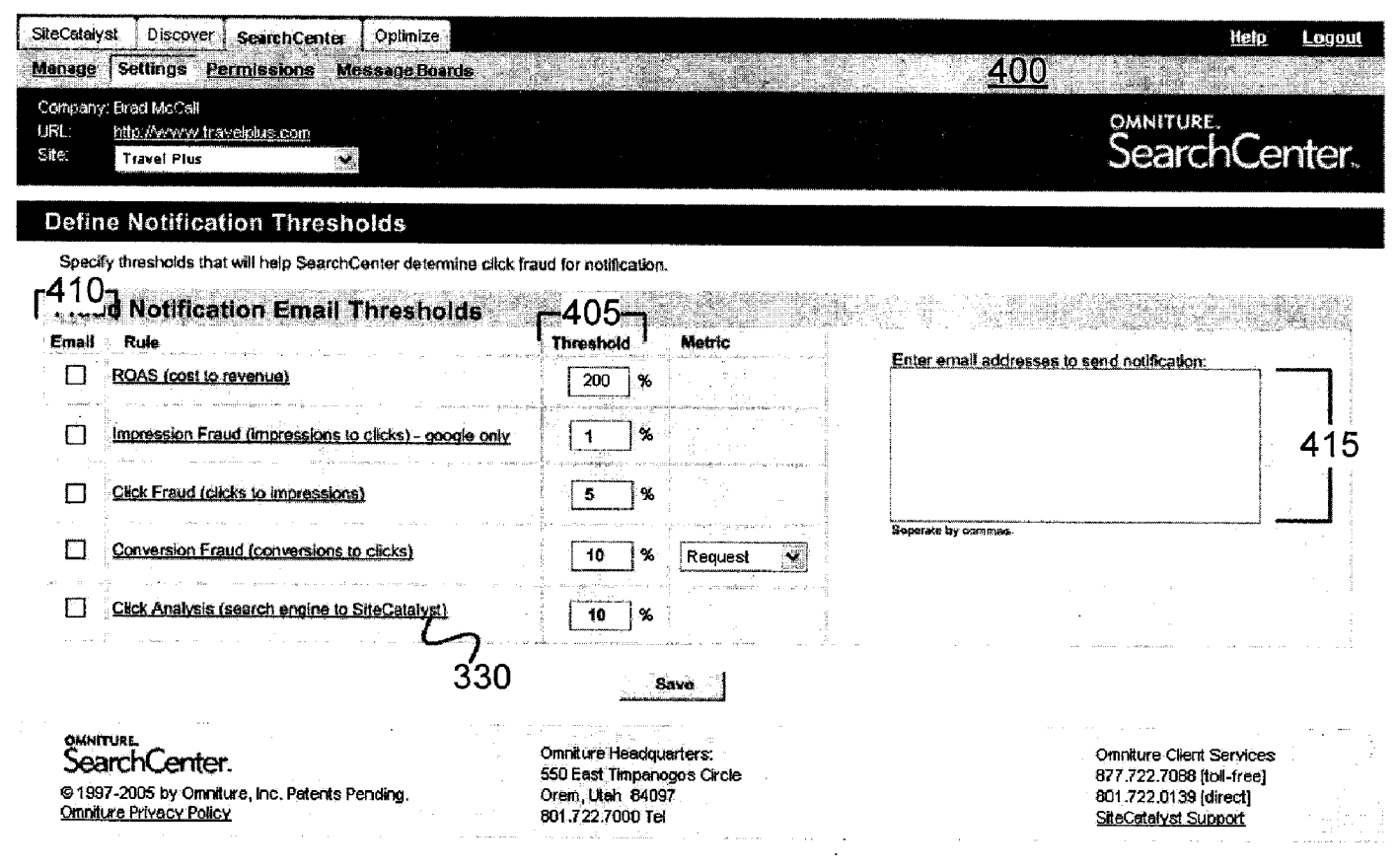

FIG. 4B illustrates a user interface showing a traffic quality alert threshold page 400 according to another embodiment of the present invention. This example illustrates an alternative layout of the threshold selection fields 405, send email checkboxes 410, and email address recipient field 415 for the traffic quality metrics 330 according to one embodiment. In this example, clicking on any of the traffic quality metrics 330, displays a report specific to that metric 330, as discussed in conjunction with FIGS. 5A-6C.

Figure 5A:
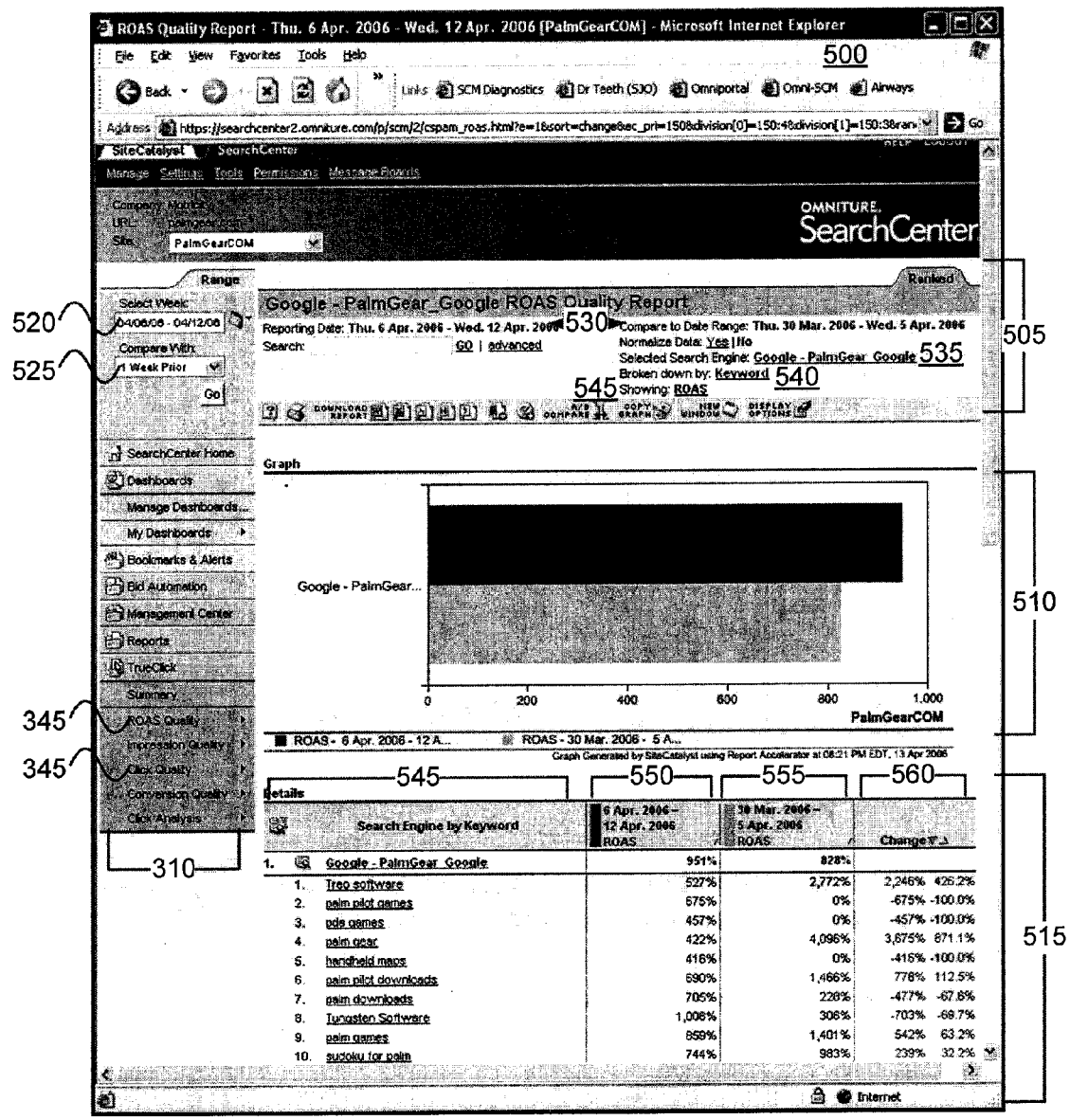
FIG. 5A illustrates a user interface showing an ROAS quality report page according to one embodiment of the present invention.

FIG. 5A illustrates a user interface showing an ROAS quality report page 500 according to one embodiment of the present invention. The ROAS quality report page 500 includes a controls area 310, a parameter area 505, a graphical display area 510, and a tabular display area 515 according to one embodiment.

The controls area 310, in addition to including links 345 for launching detailed reports associated with other traffic quality metrics 330, includes a first time period selector 520 and a second time period selector 525 according to one embodiment. In one embodiment, either or both of the time periods may include more than one date range. The data on the ROAS quality report page is compared using the first time period and second time period chosen via the selectors 520-525, and any disparity between the periods is measured against thresholds 405 described in conjunction with the alert threshold page 400. Note that the comparison is specific to a particular traffic quality metric 330 according to one embodiment, which is ROAS in the example shown in FIG. 5A.

The parameter area 505 includes various parameters pertaining to the displayed data, e.g., the date ranges 530 selected for comparison, the selected search engine 535, method of data breakdown in the display 540, and the traffic quality metric 330 displayed according to one embodiment. The date ranges 530 correspond to the time periods 520-525 selected in the controls area 310. The selected search engine 535 lists the name of the search engine corresponding to the keyword traffic quality data displayed according to one embodiment. The data breakdown method 540 indicates the granularity or parameter by which the displayed data is detailed. The search engine 535, data breakdown method 540, and traffic quality metric 330 each can be changed by clicking on the parameter currently displayed according to one embodiment.

The graphical display area 510 shows a graphical representation of percentages of the selected traffic quality metric 330 for the two time periods 520-525 according to one embodiment, e.g., for ROAS as shown in FIG. 5A. In this example, the data is shown as a summary for all keywords associated with the selected search engine 535 and traffic quality metric 330.

The tabular display area 515 shows rows and columns of detailed data for the selected search engine 535 and traffic quality metric 330 according to one embodiment. The tabular display area 515 includes a listing of the keywords 545 included in the data, the data 550-555 corresponding to the traffic quality metric 330 for the first 520 and second time periods 525 for each keyword 545, and the disparity 560, if any, between the first 520 and second time periods 525 for each keyword 545. In one embodiment, the disparity 560 indicates the actual change between the first 520 and second time periods 525 and the percentage change. A decrease in disparity 560 is visually distinguished from an increase in disparity 560 according to one embodiment, e.g., using different colors or other emphasis.

Figure 5B:
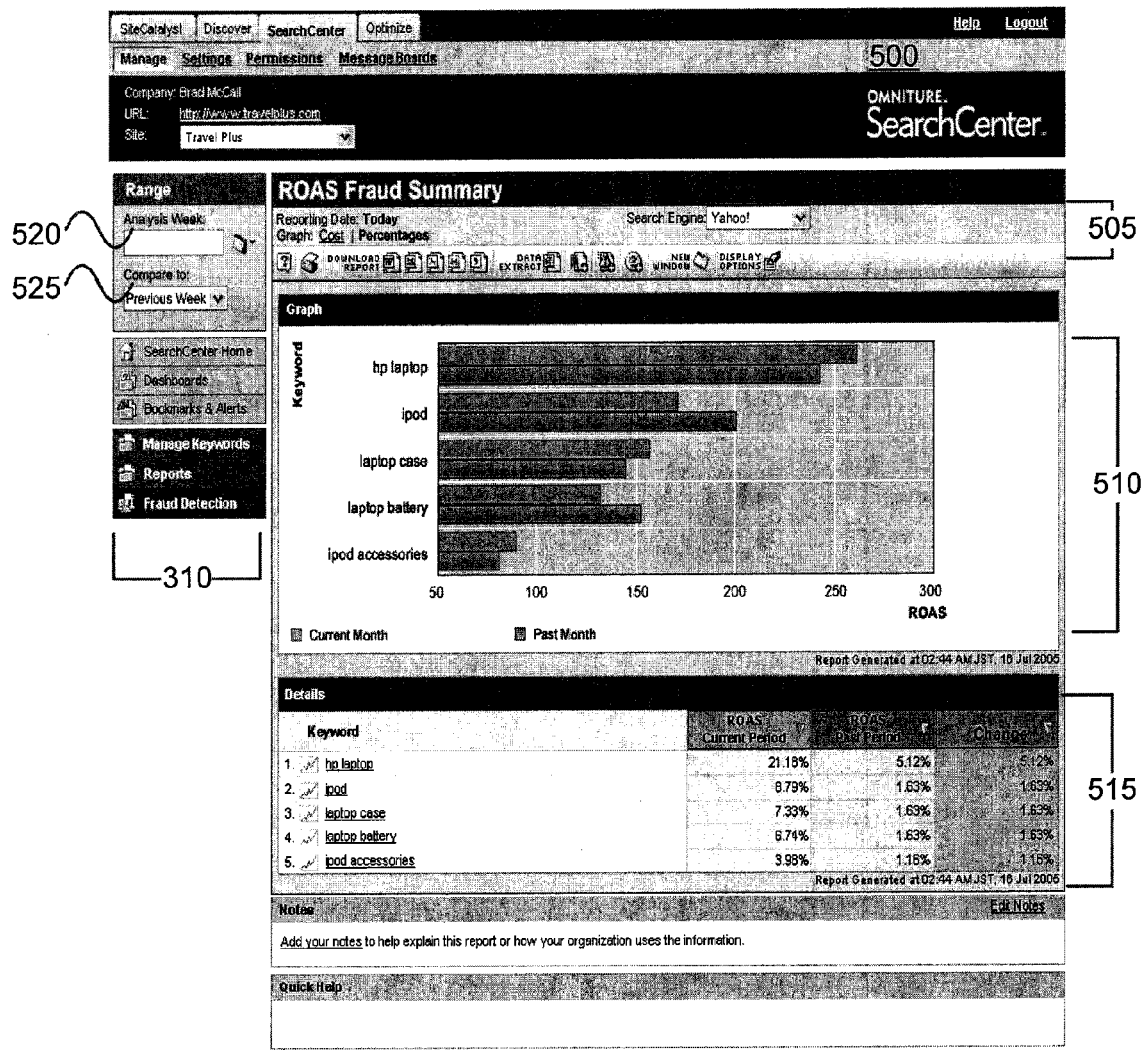
FIG. 5B illustrates a user interface showing an ROAS quality report page according to another embodiment of the present invention.

FIG. 5B illustrates a user interface showing an ROAS quality report page 500 according to another embodiment of the present invention. In this example, most of the components and functionality are similar to that described in conjunction with FIG. 5A. One difference in the example depicted is in the graphical display area 510. The graphical representation shown includes percentages for the selected traffic quality metric 330 for the two time periods 520-525 for each keyword instead of a summary of the combined values. Clicking on one of the keywords 545 displays a keyword specific traffic quality report page according to one embodiment, e.g., as shown in FIG. 5C.

Figure 5C:
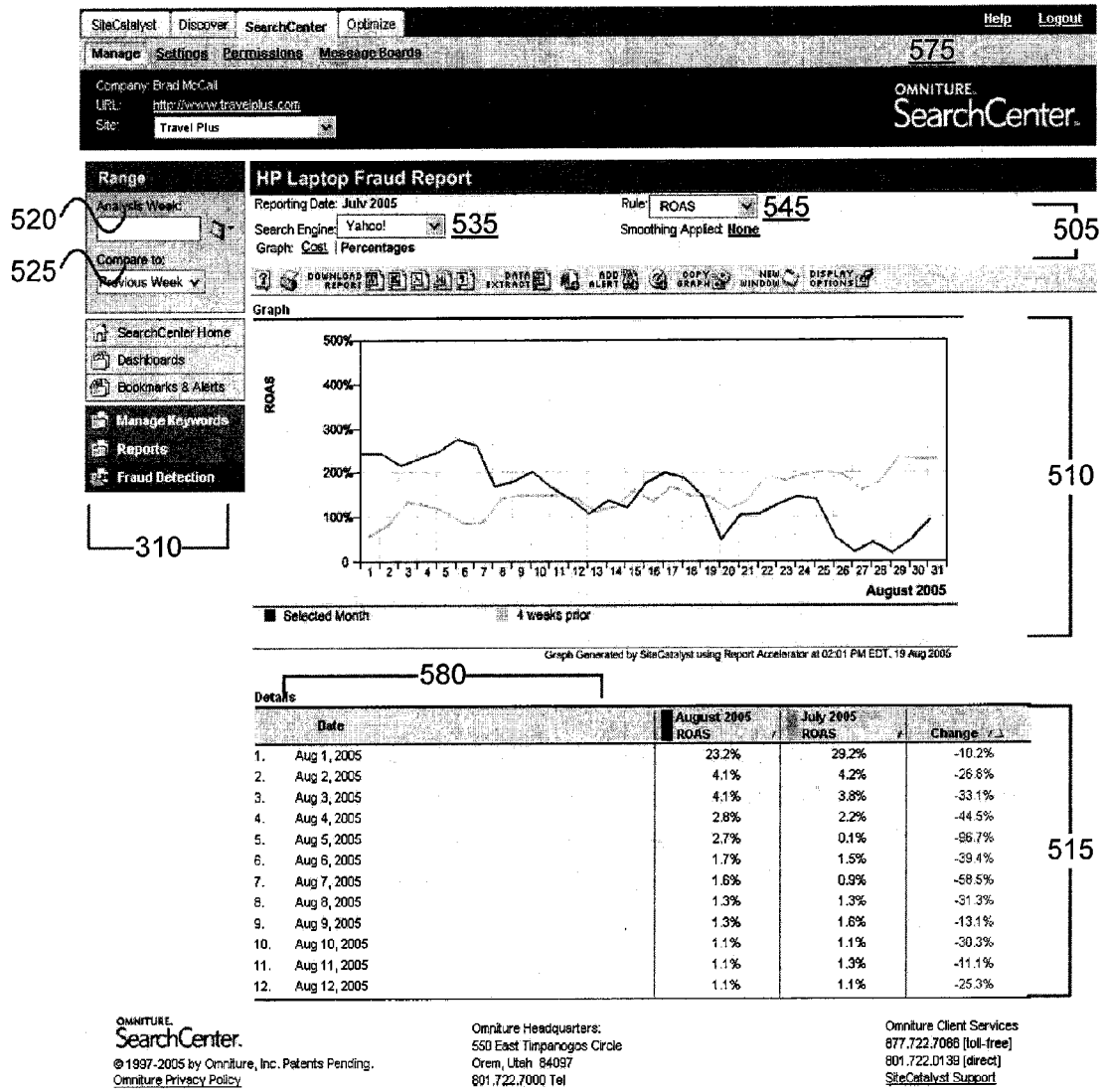
FIG. 5C illustrates a user interface showing an ROAS keyword report page according to one embodiment of the present invention.

FIG. 5C illustrates a user interface showing an ROAS keyword report page 575 according to one embodiment of the present invention. In this example, most of the components and functionality are similar to that described in conjunction with the pages 500 described in conjunction with FIGS. 5A-5B, applied to a single keyword. One difference in the example depicted is in the parameter area 505. The search engine 535 listed can be changed by the user via a dropdown menu according to one embodiment. Similarly, the traffic quality metric 330 displayed can be changed by the user via a drop down menu according to one embodiment. Changing the traffic quality metric 330 would display the keyword report page for the selected traffic quality metric 330 according to one embodiment. Another difference in the example depicted is in the graphical display area 510. The data shown is a day-by-day detail of the ROAS values, rather than the bar graph covering the entire period as shown in FIGS. 5A-5B. One additional difference in the example depicted is in the tabular display area 515. The data 580 displayed is day-by-day, similar to the data in the graphical display area 510 according to one embodiment.

Figure 5D:
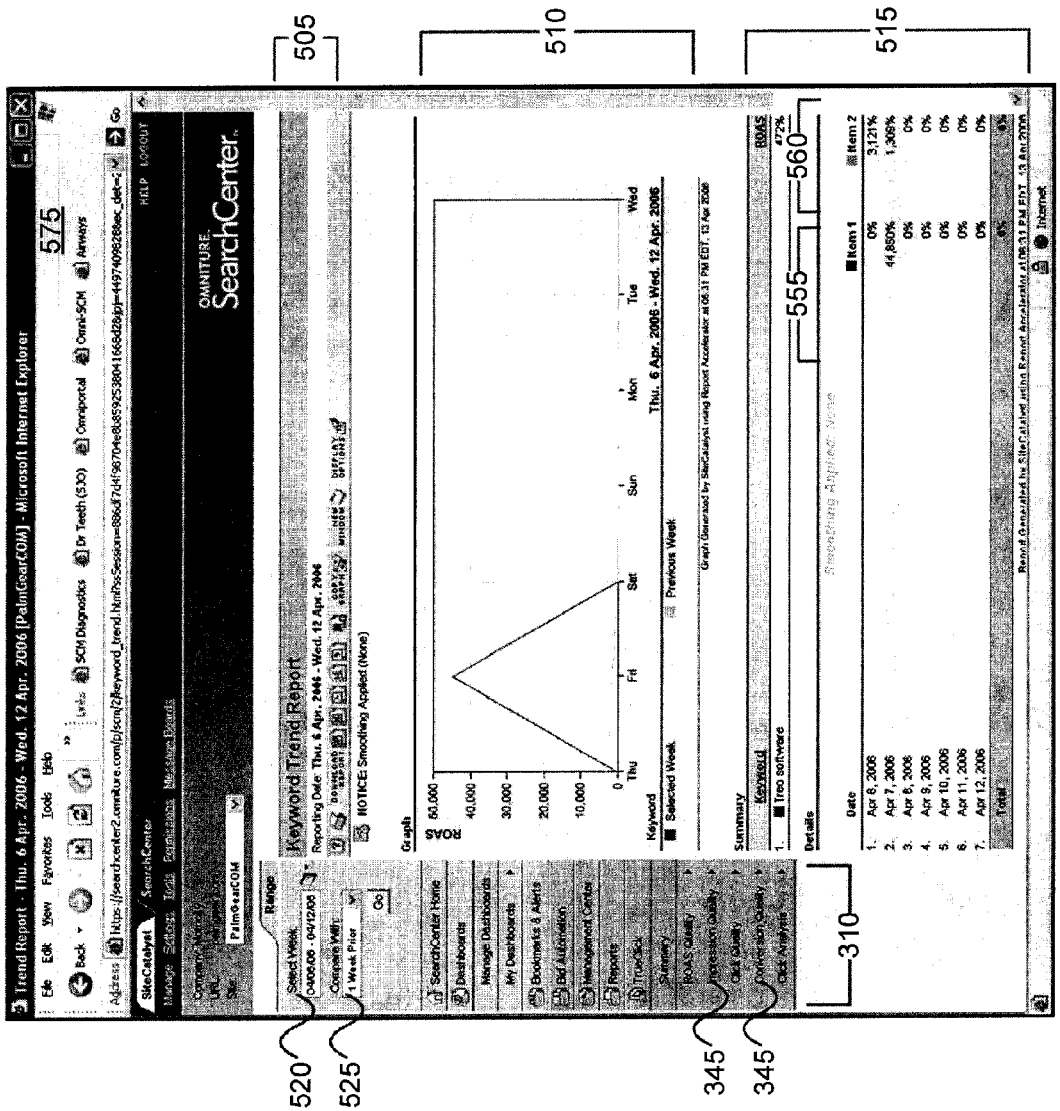
FIG. 5D illustrates a user interface showing an ROAS keyword report page according to another embodiment of the present invention.

FIG. 5D illustrates a user interface showing an ROAS keyword report page 575 according to another embodiment of the present invention. In this example, most of the components and functionality are similar to that described in conjunction with FIG. 5C.

Figure 6A:
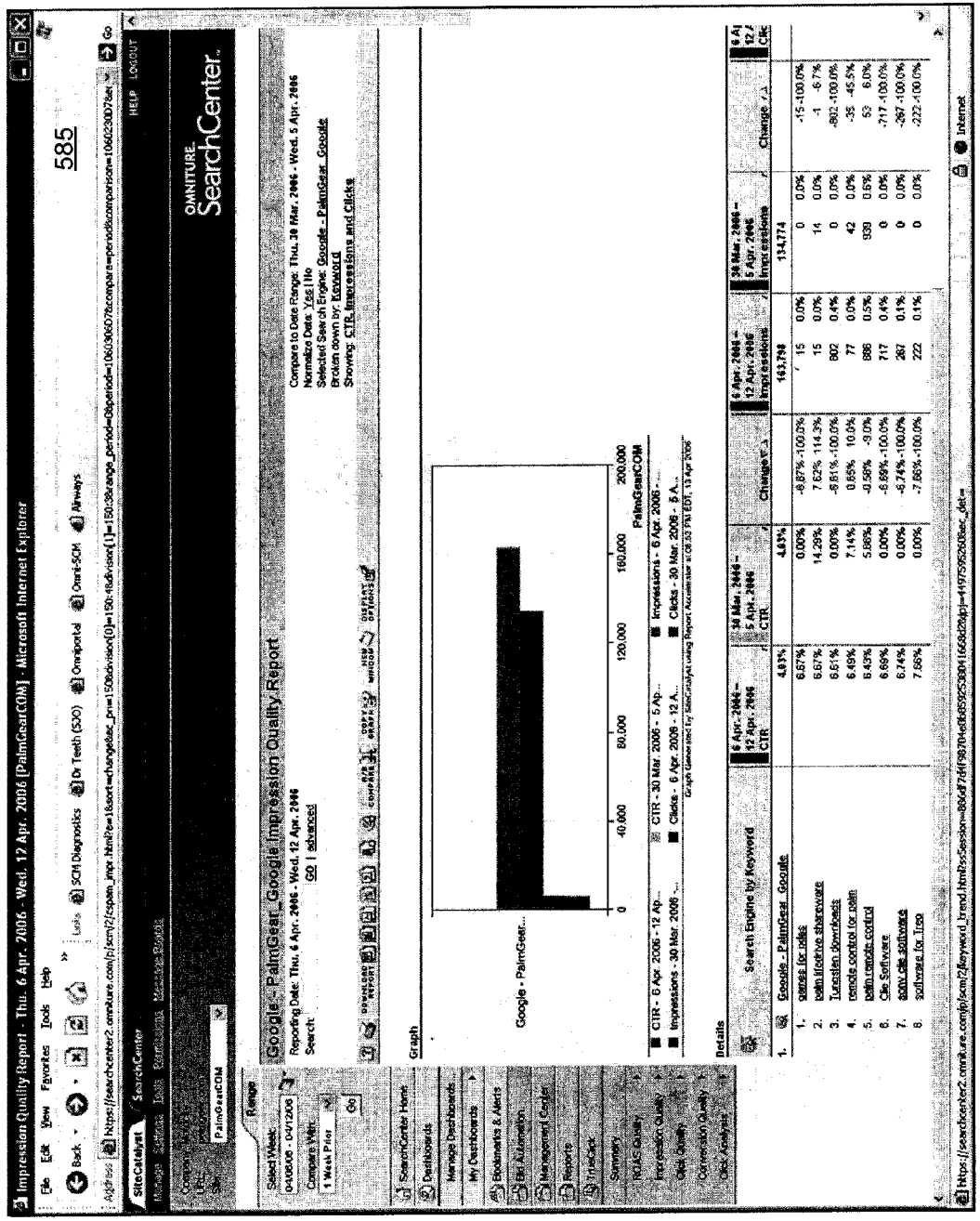
FIGS. 6A-C illustrate user interfaces showing traffic quality report pages for several traffic quality metrics according to various embodiments of the present invention.
Figure 6B:
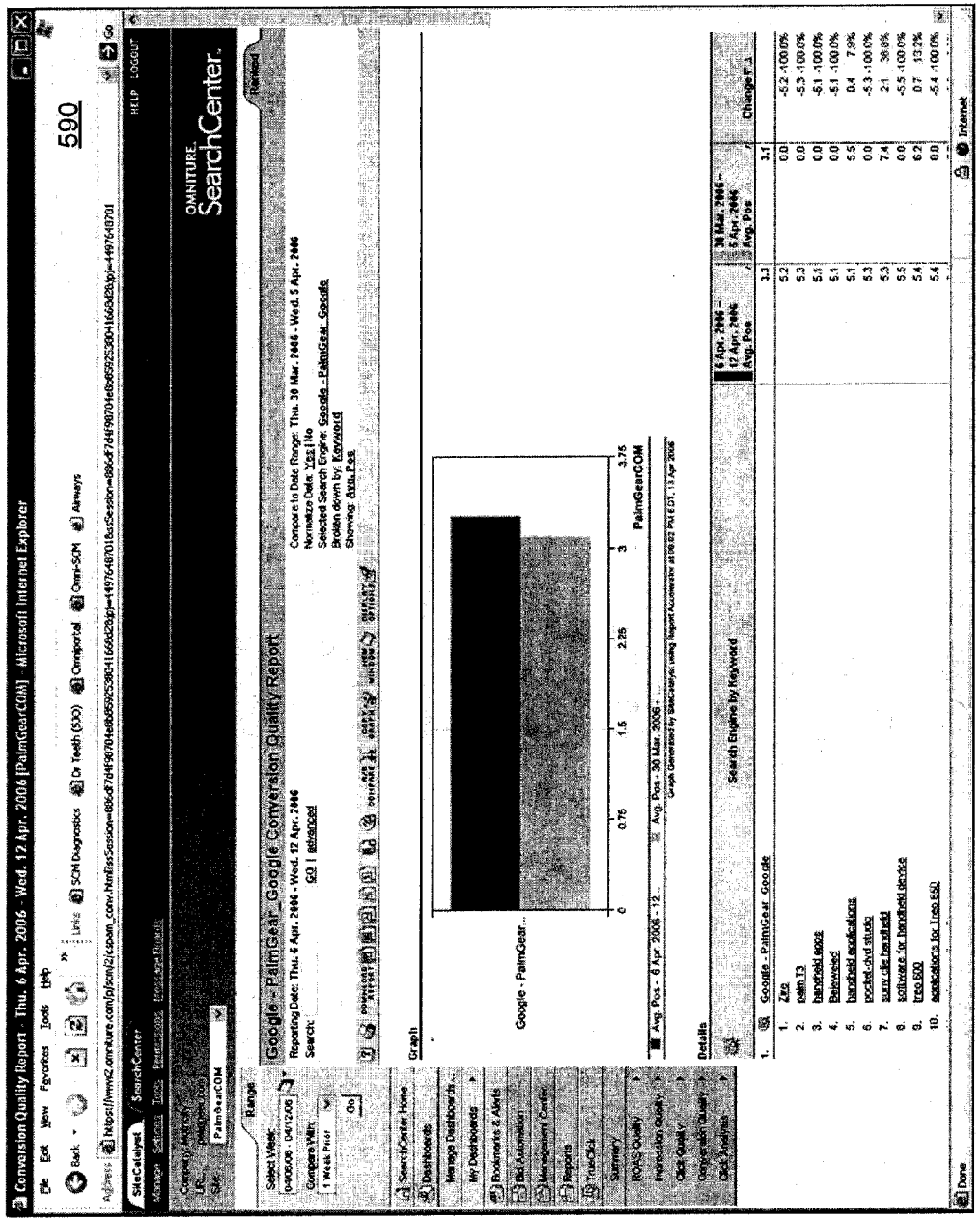
Figure 6C:
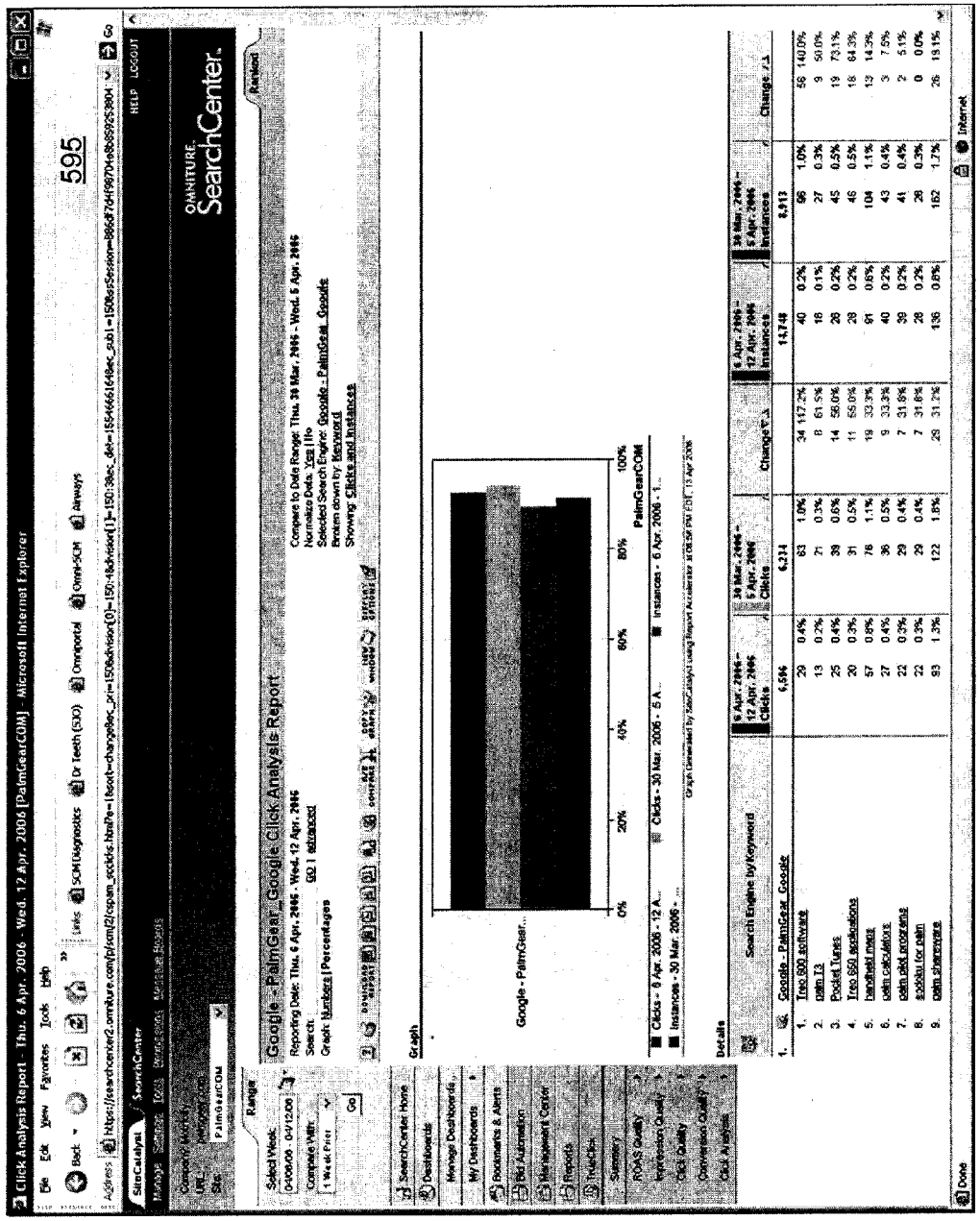

FIGS. 6A-C illustrate user interfaces showing traffic quality report pages 585-595 for several traffic quality metrics according to various embodiments of the present invention. FIG. 6A shows an impression quality report page 585, which is similar to the ROAS quality report page 500 shown in FIG. 5A, but for a different traffic quality metric. Likewise, FIG. 6B shows a conversion quality report 590 and FIG. 6C shows a click analysis quality report 595. The click analysis quality report 595 example shown also includes the ability to compare data between two or more traffic quality metrics 330 for the two time periods 520-525.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of displaying an indication of traffic quality, the method comprising:
    receiving from a user interface of a computer, a selection of a first time period and a second time period for comparing quality of traffic referred to a website by a given entity, wherein:
        the traffic is associated with a plurality of users referred to the website by the given entity; and
        the quality of the traffic is quantified by a plurality of metrics that are dependent on interactions between each user and the website occurring subsequent to the user arriving at the website;
    receiving from the user interface of the computer, respective user-specified threshold values for each of the metrics;
    retrieving, by the computer, traffic data stored for the first time period and traffic data stored for the second time period, the traffic data indicating respective values for the traffic quality metrics for the first and second time periods;
    determining, by the computer, disparities between the respective values for the traffic quality metrics for the first time period and those for the second time period;
    determining, by the computer, whether one or more of the disparities are indicative of click-fraud based on comparing the disparities to the respective user-specified thresholds; and
    displaying, by the computer, an indication of whether one or more of the disparities is indicative of click-fraud, according to said determining whether the one or more disparities are indicative of click-fraud.

2. The method of claim 1, wherein the traffic data is retrieved from storage.

3. The method of claim 1, wherein the traffic data is provided by a bid management system.

4. The method of claim 1, wherein the traffic quality metrics are selected from a group consisting of revenue over ad spend, impressions, clicks, conversions, and click comparisons.

5. The method of claim 1, further comprising preparing the traffic data for display.

6. The method of claim 1, wherein the indication of quality is a summary indicator icon.

7. The method of claim 1, wherein the indication of quality is a traffic quality report comprising the first time period data, the second time period data, and a disparity between the first time period data and the second time period data corresponding to a traffic quality metric.

8. The method of claim 1, wherein the given entity corresponds to a search engine.

9. The method of claim 1, further comprising displaying an indication of whether another of the one or more of the disparities is indicative of click-fraud in response to user input.

10. The method of claim 1, further comprising displaying a refinement of the indication associated with at least one keyword.

11. The method of claim 1, wherein the first time period data comprises more than one date range.

12. The method of claim 1, wherein the second time period data comprises more than one date range.

13. A computer program product for displaying an indication of traffic quality, the computer program product comprising: a computer-readable medium; and computer program code, coded on the medium, for:
    receiving from a user interface, a selection of a first time period and a second time period for comparing quality of traffic referred to a website by a given entity, wherein:
        the traffic is associated with a plurality of users referred to the website by the given entity; and
        the quality of the traffic is quantified by a plurality of metrics that are dependent on interactions between each user and the website occurring subsequent to the user arriving at the website;
    receiving from the user interface, respective user-specified threshold values for each of the metrics;
    retrieving traffic data stored for the first time period and traffic data stored for the second time period, the traffic data indicating respective values for the traffic quality metrics for the first and second time periods;
    determining, by the computer, whether one or more of the disparities are indicative of click-fraud based on comparing the disparities to the respective user-specified thresholds; and
    displaying, by the computer, an indication of whether one or more of the disparities is indicative of click-fraud, according to said determining whether the one or more disparities are indicative of click-fraud.

14. The computer program product of claim 13, wherein the traffic data is provided by a bid management system.

15. The computer program product of claim 13, wherein the traffic quality metrics are selected from a group consisting of revenue over ad spend, impressions, clicks, conversions, and click comparisons.

16. The computer program product of claim 13, wherein the indication of traffic quality is a traffic quality report comprising the first time period data, the second time period data, and a disparity between the first time period data and the second time period data corresponding to one or more of the traffic quality metrics.

17. The computer program product of claim 13, wherein the first time period data comprises more than one date range.

18. The computer program product of claim 13, wherein the second time period data comprises more than one date range.

19. A computer readable memory storing a computer program executable by a processor, the computer program producing a user interface for displaying an indication of traffic quality, the user interface comprising:
    a software portion for receiving user input to display an indication of traffic quality;
    a software portion for receiving user input selecting date ranges for a first time period and date ranges for a second time period for comparing quality of traffic referred to a website by a given entity, wherein:
        the traffic is associated with a plurality of users referred to the website by the given entity; and
        the quality of the traffic is quantified by a plurality of metrics that are dependent on interactions between each user and the website occurring subsequent to the user arriving at the website;
    a software portion for receiving from the user interface, respective user-specified threshold values for each of the metrics;

a software portion for comparing the traffic data for the first time period selected from the user input to the traffic data for the second time period selected from the user input to determine disparities between respective values for the traffic quality metrics for the first time period and those for the second time period;

a software portion for determining whether one or more of the disparities are indicative of click-fraud based on comparing the disparities to the respective user-specified thresholds; and a software portion for displaying an indication of whether one or more of the disparities is indicative of click-fraud, according to said determining whether the one or more disparities are indicative of click-fraud.

20. The computer readable memory of claim 19, wherein the indication comprises tabular data.

21. The computer readable memory of claim 19, wherein the indication comprises graphical data.

22. The computer readable memory of claim 19, wherein the traffic data is provided by a bid management system.

23. The computer readable memory of claim 19, wherein the traffic quality metrics are selected from a group consisting of revenue over ad spend, impressions, clicks, conversions, and click comparisons.

24. The computer readable memory of claim 19, wherein the indication of traffic quality is a traffic quality report comprising the first time period data, the second time period data, and a disparity between the first time period data and the second time period data corresponding to one or more of the traffic quality metrics.

25. The computer readable memory of claim 19, wherein the first time period data comprises more than one date range.

26. The computer readable memory of claim 19, wherein the second time period data comprises more than one date range.

* * * * *